United States Patent [19]  
Oestreich

[11] Patent Number: 4,838,635  
[45] Date of Patent: Jun. 13, 1989

[54] METAL-FREE, SELF-SUPPORTING OPTICAL CABLE

[75] Inventor: Ulrich Oestreich, Munich, Fed. Rep. of Germany

[73] Assignee: Siemens Aktiengesellschaft, Berlin and Munich, Fed. Rep. of Germany

[21] Appl. No.: 261,490

[22] Filed: Oct. 24, 1988

[30] Foreign Application Priority Data

Oct. 28, 1987 [DE] Fed. Rep. of Germany ....... 3736529

[51] Int. Cl.$^4$ .......................... G02B 6/44; H02G 3/00
[52] U.S. Cl. ............................. 350/96.23; 174/70 A; 174/102 A
[58] Field of Search ................. 350/96.23; 174/70 A, 174/102 R, 102 A, 102 C, 102 SP, 102 P, 102 D, 102 E, 103

[56] References Cited

U.S. PATENT DOCUMENTS

| 4,374,608 | 2/1983 | Anderson | 350/96.23 |
| 4,541,686 | 9/1985 | Barfuss et al. | 350/96.23 |
| 4,629,285 | 12/1986 | Carter et al. | 350/96.23 |
| 4,673,247 | 6/1987 | Oestreich | 350/96.23 |
| 4,677,418 | 6/1987 | Shulver | 174/102 R |
| 4,744,637 | 5/1988 | Eichenbaum et al. | 350/96.23 |
| 4,776,665 | 10/1988 | Oestreich | 350/96.23 |

Primary Examiner—William L. Sikes  
Assistant Examiner—Georgia Y. Epps  
Attorney, Agent, or Firm—Hill, Van Santen, Steadman & Simpson

[57] ABSTRACT

A metal-free optical cable has a cable core with a plurality of optical fibers in a sheath, which is surrounded by a carrier member in the form of at least one ply of a high-strength film material. The improvement characterized by the filament material being held together by an externally applied winding of a filament forming an armoring layer with the filament being of a shorter length of lay than the filament material for the carrier member and being of a material exhibiting electrical properties that are substantially the same as the material of the filament forming the carrier member.

14 Claims, 1 Drawing Sheet

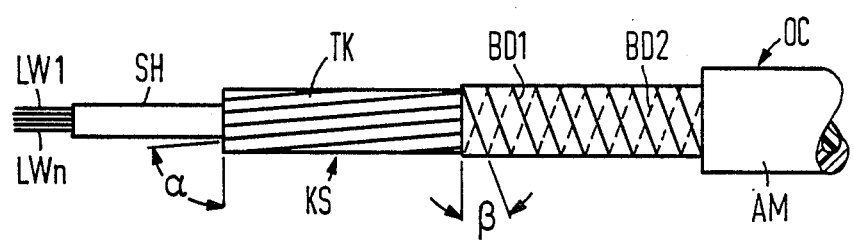

METAL-FREE, SELF-SUPPORTING OPTICAL CABLE

BACKGROUND OF THE INVENTION

The present invention is directed to a metal-free, self-supporting optical cable which is utilized as an overhead cable in a field region between phase cables of a high-voltage aerial line. The cable is constructed as a weakly or slightly electrically conductive cable and has a cable core surrounded by at least one ply of high-strength filament material to form a carrier member and supporting element, and an outer cable cladding.

It is known to arrange optical overhead cables in the region of high-voltage aerial lines. A cable of this type is disclosed in U.S. Pat. No. 4,673,247, whose disclosure is incorporated by reference thereto and which claims priority from German Patent Application Nos. 34 24 047 and 35 04 041. The cable of this patent has a plurality of light waveguides which are accommodated inside of a tubular protective sheath and they are embedded in a filling compound composed of a soft, resilient, pasty material. At least one ply of high-tensile strength filament material is applied to this protective sheath and is preferably formed of an aramid thread. The cable formed in this way is provided with an external cable cladding.

U.S. Pat. No. 4,776,665, which corresponds to European Pat. No. A2 02 14 480, and whose disclosure is incorporated by reference, teaches that an overhead cable arranged in the field region between the phase cables of a high-voltage aerial field is fashioned with a weakly or slightly electrical conductivity in the cable core, namely so that the specific resistance of the cable core lies between $10^5$ ohm centimeter and $10^{10}$ ohm centimeter. In this way, undesirable damage to the cladding due to external or internal partial discharges or tracking currents are largely avoided.

Particularly when aramid threads are involved, the high tensile strength filament material is expediently pre-stretched and is radially compressed as far as possible, for example, is applied in a tight ply. These measures are important in order to largely anticipate the initial or "setting" dilatation of the filament material, to obtain electrically quasi-homogeneous, potentially weakly or slightly conductive member and in order to enable the reliable bracing of the cable on a non-yielding foundation.

A polyester foil has heretofore been used for the compressing armoring of the filament material. This polyester foil has been wrapped around the filament material and has been arranged in an overlapping relationship in a longitudinal direction. This kind of armoring and compressing of the filament material has a number of disadvantages. First, the foil to be employed for these purposes are relatively expensive. In addition, the foils tend to form folds or can even tear. Another disadvantage that occurs during manufacturing is that the firm application of the foil is only possible at a moderate speed. The foil strips have only an extremely limited running length (supply lengths) and, therefore, force frequent stopping of the manufacturing process. The foil and the cladding can, therefore, not be applied in one work cycle but require two manufacturing procedures following one another. Another disadvantage, that is of considerable importance given overhead cables in the region of electrical fields, is that the foils have relatively good insulating properties and, thus, present a disturbing insulator between the filament material, which is normally far lower in impedance and the non-tracking outside cladding. For example, the aramid threads or fibers of the above-mentioned U.S. Pat. No. 4,776,665 have a specific resistance on the order of magnitude of $10^7$ ohm centimeter, whereby the value of resistance on the order of magnitude of $10^{10}$ ohms centimeter can be counted on for the outer cladding. Foils of polyester material or other materials, which are considered by contrast, have a specific resistance on the order of magnitude of $10^{14}$–$10^{18}$ ohm centimeter and, thus, form an insulating layer between the cladding that is conductive to a certain extent and the filament material of the cable core of aramid threads, which has a far higher conductivity. Such a structure can lead to partial discharge at the foil, given corresponding field strengths.

SUMMARY OF THE INVENTION

The object of the present invention is to provide a way in which an optimally tight packing of the filament material can be guaranteed and which avoids problems with high-impedance insulating layers, too great an outlay or cost for manufacturing and disadvantageous properties for the finished cable These objects are obtained in an improvement in a metal-free, self-supporting optical cable for utilization in an overhead cable in a field region between phase cables of high-voltage aerial lines, said optical cable having a cable core, which has a slight electrical conductivity, a carrier member in the form of at least one ply of high-strength filament material being provided as a carrier element on the core and an outer cable cladding. The improvements are that the filament material is held together by an armoring firmly applied on the outside of the ply of filament material, said armoring being composed of a material having electrical properties or at least similar to those of the filament material and is applied with a shorter length of lay than the length of lay of the filament material.

The tightly seated and firmly applied armoring layer achieves a reliable compression of the filament material and also guarantees a reliable electrical and mechanical connection of the carrier member and cladding. Extremely long running lengths can be achieved by employing band-shaped or thread-shaped armoring so that it becomes superfluous to stop the manufacturing equipment. In addition, the application of the armoring can occur immediately before the application of the outside cladding so that the manufacturing of the optical cable can be carried out in a single working cycle. Another advantage is that the fast-running reeling machines can be utilized during the manufacturing. A still further advantage also occurs that the cladding material is well anchored on the armoring and also adheres to the filament material lying therebelow. As a result of at least similar electrical properties of the armoring and filament material, the armoring layer does not form a highly insulating intermediate layer and no problems in the region of the electrical fields will occur.

An especially advantageous solution to the application of armoring is that the armoring is applied as a double-thread or double ply layer, which plies are wound in an opposite direction.

The angle of twist for the threads forming the armoring ply, which is defined as an angle between the thread and a plane extending perpendicular to the axis of the cable, are in the order of magnitude of 10°–15° when a single ply of armoring is utilized. When double-plies or crossed armoring is carried out, the angle of twist is in a range of 20°–30°, which can be obtained by doubling the speed during the application of the ply. The double-plies, cross application of armoring also has the advantage that no resultant torque occurs and an even higher compression is achieved.

The filament material itself has an optimally high angle of twist, which is in the range of 75–90° and is preferably about 85°.

Other advantages and features of the invention will be readily apparent from the following description of the preferred embodiments, the drawing and the claims.

BRIEF DESCRIPTION OF THE DRAWING

The FIGURE is a side view of the cable of the present invention with different layers being removed to show the contents of the cable.

DESCRIPTION OF THE PREFERRED EMBODIMENTS

The principles of the present invention are particularly useful when incorporated in an overhead cable, generally indicated at OC in the drawing. The cable OC has a number of light waveguides LW1-LWn, which are accommodated inside a protected sheath SH that is composed of an extruded material, preferably a high-strength injection molding material having a high resistance. An example of these materials are aromatically substituted PA, PBTP PC etc.

PA=Plyamide
PBTP=Polybutylaneterophthalate
PC=Polycarsonate

It is expedient to fill the interior of the protective sheath SH with a pasty or soft, partially cross linked filling compound in order to prevent the penetration of water and in order to also allow a mechanical gentle embedding of the sensitive light waveguides LW1-LWn.

Instead of a single protective sheath SH, a plurality of such protective sheaths which have a hollow tubular structure can also be arranged in the inner region of the optical cable OC.

In order to achieve an adequate tensile strength that is indispensable when using the cable as an overhead cable, a carrier member TK is provided and is arranged in the form of a filament material on the protective sheath SH in one or more plies. As illustrated, the filament material of the carrier member is applied with an angle of twist $\alpha$, which is in the range of roughly 80°–90° and is preferably 85°. These high angles of twist are required in order to utilize the necessary tensile strength of the filament material. Aramid threads are preferably utilized for the filament material and these have been prestretched before or during application to yield a good tensile strength, particularly when they are compressed as far as possible in a radial direction. A great compression is also expedient because an electrically quasi-uniform carrier member is thereby obtained. It is expedient to fashion the tightly packed filament materials of the carrier member TK in relatively low-impedance fashion, namely having a specific resistance in the order of magnitude of between $10^5$ ohm centimeter and $10^{10}$ ohm centimeter, and preferably about $10^7$ ohm centimeter. This can be particularly achieved in that the high strength of plastic filaments or glass filaments are a mixture of the two having an ionogenic surface are provided. It is also possible to apply an ionogenic layer onto the actual plastic threads or glass threads of the filament material or to utilize filaments that are provided with a swelling powder or with an ionogenic coating. Additional details in respect to this ionogenic coating are disclosed in U.S. Pat. No. 4,776,665.

For tight packing of the filament material of the carrier member TK, an armoring is provided that is applied with a significantly smaller angle of twist $\beta$. The angle $\beta$ should be in a range of ⅓ to 1/10 of the angle of twist $\alpha$ for the filament material of the carrier member TK. The armoring and, thus, the compression of the carrier member TK composed of the filament material can occur, for example, with a single ply BD1 in, for example, the form of the aramid threads or glass threads or of a thin band whereby the angle of twist $\beta$, given a single ply armoring is to be expediently selected in a range of between 10 and 15°.

It is expedient in many instances to provide a second armoring ply BD2 (indicated in broken lines here) given such a double-thread cross winding, the angle of twist can be kept higher, whereby the values in a range of between 20 and 30° are expedient.

The armoring plies BD1 and BD2 are, likewise, composed of materials having property that are at least similar to those of the filament material, in particular, also with respect to the lower, specific ohmic resistance. Insofar as possible, there should be no excessive great difference between the specific resistance of the carrier member TK and the specific resistance of the materials used for the armoring plies BD1 and BD2. It is expedient to provide specific resistance in the order of magnitude of a range between $10^5$ ohm centimeter and $10^{12}$ ohm centimeter, particularly in a range between $10^5$ and $10^{10}$ ohm centimeter, both for the carrier member TK, as well as for the armoring plies BD1 and BD2. The simplest way is to use the same basic material for the carrier members TK and for the armoring plies BD1 and BD2. This basic material being subject to the same or similar treatment, for example, impregnation with ionogenic material in order to reduce the specific resistance.

A cable core KS, which is formed by the light waveguides in the sheath SH, which is surrounded by the carrier member TK and one or more plies BD1 and BD2 of the armoring layer, is then provided with an outside cladding layer AM that is likewise expediently fashioned to be slightly conductive and have a specific resistance in a range of between $10^7$ and $10^{12}$ ohm centimeter. The insulation resistance of the overall optical cable OC would then lie in a range of between $10^{10}$ and $10^7$ ohm/m.

Although various minor modifications may be suggested by those versed in the art, it should be understood that I wish to embody within the scope of the patent granted hereon all such modifications as reasonably and properly come within the scope of my contribution to the art.

I claim:

1. In a metal-free, self-supporting optical cable for use as an overhead cable in the field region between phase cables of a high voltage aerial line, said optical cable being composed of a cable core being slightly electrically conductive and being surrounded by a carrier member in the form of at least one ply of high-strength filament materials to form a carrier element and surrounded by a cable cladding, the improvements comprising the filament material being held together by an armoring layer firmly applied onto the outside of said filament material, said armoring layer being composed of a material having electrical properties that are at least similar to those of the filament material and being applied with a shorter length of lay than the length of lay of the filament material.

2. In an optical cable according to claim 1, wherein the filament material of the carrier member is applied with an optimally large angle of twist in the order of 80°–90° to a plane extending perpendicular to the axis of said cable.

3. In an optical cable according to claim 2, wherein the armoring is applied with an angle of twist that is smaller by a factor in a range of ⅓ to 1/10 of the angle of twist for the filament material of the carrier member.

4. In an optical cable according to claim 3, wherein the angle of twist of the carrier members is preferably 85°.

5. In an optical cable according to claim 2, wherein the armoring is applied as a single-thread application with an angle of twist in the range of 20°–30°.

6. In an optical cable according to claim 2, wherein the armoring is applied as a double layer, double-thread application and the angle of twist of the armoring is in a range of between 10° and 15°.

7. In an optical cable according to claim 1, wherein a specific resistance of the carrier member and of the armoring lies in a range of between $10^5$ and $10^{12}$ ohm centimeter.

8. In an optical cable according to claim 7, wherein the specific resistance is in a range of $10^5$ and $10^{10}$ ohms centimeter.

9. In an optical cable according to claim 1, wherein the cable cladding is fashioned as a slightly electrically conductive material having a specific resistance lying in a range of between $10^7$ and $10^{12}$ ohms centimeter.

10. In an optical cable according to claim 1, wherein the insulating resistance of the overall optical cable lies in the range of between $10^7$ and $10^{10}$ ohms/meters 11. In an optical cable according to claim 1, which includes an additive selected from aluminum hydoxide and ionogenic material being applied to at east one of the cable cladding and carrier member.

12. In an optical cable according to claim 1, wherein the armoring is impregnated with an ionogenic material.

13. An optical cable according to claim 1, wherein the armoring material is composed of a filament rendered ionogenic.

14. An optical cable according to claim 1, wherein the armoring is formed by a thread having at least an outer layer that is of an ionogenic material.

* * * * *